United States Patent
Moreels et al.

(10) Patent No.: US 7,583,616 B2
(45) Date of Patent: Sep. 1, 2009

(54) NETWORK UNIT FOR FORWARDING AN ETHERNET PACKET

(75) Inventors: Johan Marie Camiel Moreels, Roosdaal-Strijtem (BE); Nico Alfred Anna Janssens, Overmere (BE)

(73) Assignee: Alcatel, Paris (FR)

( * ) Notice: Subject to any disclaimer, the term of this patent is extended or adjusted under 35 U.S.C. 154(b) by 622 days.

(21) Appl. No.: 10/993,121

(22) Filed: Nov. 22, 2004

(65) Prior Publication Data
US 2005/0138206 A1  Jun. 23, 2005

(30) Foreign Application Priority Data
Dec. 19, 2003  (EP) .................................. 03293271

(51) Int. Cl.
*H04L 12/28* (2006.01)
*H04L 12/56* (2006.01)

(52) U.S. Cl. .................. 370/254; 370/392; 370/401

(58) Field of Classification Search ............... 370/237, 370/238, 254, 255, 351, 389, 392, 400, 401, 370/412, 432
See application file for complete search history.

(56) References Cited

U.S. PATENT DOCUMENTS

| | | | | |
|---|---|---|---|---|
| 5,436,617 A | * | 7/1995 | Adams et al. ............... | 370/254 |
| 6,603,769 B1 | | 8/2003 | Thubert et al. | |
| 6,628,623 B1 | * | 9/2003 | Noy ........................... | 370/255 |
| 6,912,223 B1 | * | 6/2005 | Sloane ........................ | 370/401 |
| 7,031,297 B1 | * | 4/2006 | Shabtay et al. .............. | 370/352 |
| 7,079,537 B1 | * | 7/2006 | Kanuri et al. ................ | 370/392 |
| 7,277,425 B1 | * | 10/2007 | Sikdar ......................... | 370/366 |
| 7,411,916 B2 | * | 8/2008 | Sakov et al. ................. | 370/252 |
| 2002/0012352 A1 | | 1/2002 | Hansson et al. | |
| 2003/0133450 A1 | * | 7/2003 | Baum .......................... | 370/389 |
| 2003/0211839 A1 | * | 11/2003 | Baum et al. ................. | 455/403 |
| 2003/0218978 A1 | * | 11/2003 | Brown ......................... | 370/230 |
| 2005/0100010 A1 | * | 5/2005 | Jain et al. .................... | 370/389 |

FOREIGN PATENT DOCUMENTS

WO   WO 02/061599 A1   8/2002

OTHER PUBLICATIONS

ISO/IEC 15802-3: 1998, ANSI/IEEE Std. 802.1D, 1998 Edition, pp. 1-355.

* cited by examiner

*Primary Examiner*—Hong Cho
(74) *Attorney, Agent, or Firm*—Sughrue Mion, PLLC

(57) ABSTRACT

An extractor extracts from the payload of the Layer 2 packet a destination Layer 3 address of the Layer 3 packet. A forwarding engine, for in response to the extraction, with the destination Layer 3 address retrieves from a forwarding database an associated interface. The forwarding database includes at least one association between one of the plurality of interfaces and at least one Layer 3 address. Upon reception of the destination Layer 3 address having a full match with one of the Layer 3 addresses, the forwarding database provides the interface which is associated to the Layer 3 address. The network unit forwards the Layer 2 packet to the provided associated interface.

15 Claims, 1 Drawing Sheet

NETWORK UNIT FOR FORWARDING AN ETHERNET PACKET

BACKGROUND

The present invention relates to a network unit for forwarding a Layer 2 packet such as an Ethernet packet that includes a Layer 3 packet such as an Internet Protocol packet, in its payload. Such a network unit to forward a Layer 2 packet is already known in the art and is for instance described in the published Standard with reference IEEE 802.1D, 1998: Self-learning Ethernet bridges, which is included here by reference.

This 802.1D document describes from page 29 to page 49 the following functionality of the Self-learning Ethernet bridge:
  Paragraph 7.1 Bridge operation;
  Paragraph 7.3 Model of operation;
  Paragraph 7.7 Forwarding process
  Paragraph 7.8 The learning process
  Paragraph 7.9 The Filtering database Such a self-learning Ethernet bridge receives an Ethernet packet with an Ethernet header and an Ethernet payload at one of its interfaces. The bridge looks into the header of the Ethernet packet and extracts from a predetermined place in the header the Ethernet Medium Access Control destination address. Furthermore, the bridge includes an Ethernet forwarding table that includes associations between one of its interfaces and a Medium access control address, called shortly hereafter MAC address. The extracted Ethernet MAC destination address is looked-up in the Ethernet forwarding table. Upon detection of an exact match of the Ethernet destination address and an Ethernet address in the forwarding table, the interface that is associated to this address is returned. In this way the Ethernet Bridge is enabled to forward the total Ethernet packet towards this denoted interface.

It has to be remarked that the bridge forwards the payload of the Layer 2 packet, in this above-mentioned example, the Ethernet packet, from one interface to another interface independently from the content of the payload. The Layer 2 forwarding is executed based only upon the content of the header of the Layer 2 packet.

It has to be remarked also that a full match of the Ethernet address is executed by the Ethernet bridge.

Furthermore, it has to be remarked that the payload of an Ethernet packet often includes the encapsulation of an Internet Protocol packet i.e. a Layer 3 packet. This is called Internet Protocol over Ethernet Medium Access protocol.

The "International Standards Organization" has put forward the Open Systems Interconnect model, thereby defining 7 layers. The Layer 2 is called the Data Link Layer. The Ethernet (MAC) frame can be mapped on this Layer 2. The Internet Protocol is typically mapped onto the Layer 3, called the Network Layer.

Furthermore, a Self-learning Ethernet Bridge, is enabled to learn the MAC addresses by himself. In this mode, the Ethernet Bridge verifies whether the Source MAC Address in the Ethernet header of every received Ethernet packet is already known in the Ethernet forwarding table. When the Ethernet MAC address is not present in the table, it will add an entry i.e. an association between the MAC source address and the interface upon which the Ethernet packet was received. If the Ethernet source MAC address is however present in the Ethernet forwarding table, the "last received" timer can be reset. This timer can optionally provide an implicit aging-mechanism.

A disadvantage of such a Layer 2 forwarding bridge is that they do only work efficiently in environments where the Layer 2 addresses in the header such as e.g. the Ethernet MAC Addresses, are unique. Indeed, MAC address are mostly used for aggregation networks whereby often a lack of structure in the MAC address is present. The manufacturer of e.g. a workstation provides such a MAC address to the workstation whereby a duplicated MAC address can be introduced by two different manufactures. Furthermore, a MAC address can be adapted by e.g. the user of a workstation whereby violating users might introduce at its own terminal MAC addresses of other users. This MAC-non uniqueness leads to poor building up of the Ethernet forwarding bridge and thereby to undesired behavior of the bridge, leading to lost or duplicated traffic.

SUMMARY

An object of the present invention is to provide a network unit for forwarding a Layer 2 packet such as an Ethernet packet, with in its payload a Layer 3 packet such as an Internet Protocol packet, and being received at an interface of a plurality of interfaces of the network unit, such as the above known network units but wherein the presence of duplicated Layer 2 addresses in the header of the Layer 2 packet doesn't lead to undesired behavior of the network unit.

According to the invention, this object is achieved due to the fact that the network unit for forwarding a Layer 2 packet being received at a receiving interface of a plurality of interfaces of said network unit, and which includes in its payload a Layer 3 packet, includes:
  an extractor for extracting from said payload of said Layer 2 packet a destination Layer 3 address of said Layer 3 packet; and
  a forwarding engine for in response to said extraction, with said destination Layer 3 address retrieving from a forwarding database an associated interface; and
  said forwarding database, including at least one association between one of said plurality of interfaces and at least one Layer 3 address for, upon reception of said destination Layer 3 address having a full match with one of said Layer 3 addresses, providing the associated interface of said plurality of interfaces being associated to said one Layer 3 address; and
  thereby enabling said network unit to forward said Layer 2 packet to said associated interface.

It has to be remarked that the network unit according to the present invention, has not its most convenient implementation in a core network, since this would require too large tables for the exact matching of the Layer 3 addresses. However, given the necessary hardware support, this application area is not excluded. However, the present network unit plays an important role in environments where the Layer 3 addresses such as IP addresses are distributed in a geographical not-grouped way i.e. were the IP Addresses are not grouped in sub-nets.

Furthermore, it is remarked that in order to execute the extracting step by the extractor, the network unit is enabled to detect in the payload of the Layer 2 packet the Layer 3 destination address. This can be realized e.g. by determining a predefined offset from a predefined starting bit in the Layer 2 packet. According to a most simple implementation the predefined starting bit in the Layer 2 packet is a predefined number of bits counted from the beginning of the Ethernet packet. However, since often the header of the Layer 2 packet such as an Ethernet header has not always the same length, this above implementation is not always applicable. Therefore the network unit interprets information of the Ethernet header and determines based upon this information the predefined starting bit. Similar, since the length of a Layer 3 packet such as an Internet packet is not always the same, whereby the predefined off-set from the predefined starting bit to the destination address is also not always the same, the network unit interprets information of the header of the Internet packet in order to determine this offset. Once the predefined starting bit and the predefined offset are determined the destination address in the Layer 3 packet can be extracted.

The present network unit differs from an Ethernet bridge as described above, mainly in the type of information field it uses to forward the packet. Indeed, an Ethernet Bridge uses the destination MAC Address of the MAC header, whereas the network unit of the present invention uses the Layer 3 address e.g. IP destination address of the payload of the Layer 2 packet. Furthermore, in an Ethernet Bridge, the Ethernet packet is forwarded according to a forwarding table that includes an association between MAC address and link of the bridge.

It has to be remarked that the network unit according to the present invention differs from an Internet Protocol Router, shortly called hereafter IP Router, in the following way.

The major difference between both forwarding devices is the fact that an IP router forwards Layer 3 packets i.e. Internet Protocol packets and that the network unit according to the present invention forwards Layer 2.

The IP router forwards the IP packets based on a forwarding table with an association between and Internet Protocol address and a link of the router. In this way the IP router looks into the header of the received IP packet, extracts a destination IP address and looks-up the destination IP address in an IP forwarding table in order to determine an interface of the IP router and to forward the IP packet to this interface.

Even in a network where a Layer 2 packet such as an Ethernet packet that includes an Internet Packet would be received by an Internet Protocol Router, the Ethernet header of the Ethernet packet is removed from the packet, whereby the IP router executes its IP routing function on a normal IP packet and based upon the content of the IP header, and whereby the forwarded IP packet is encapsulated again in the payload of a new Ethernet packet with a new Ethernet header. In this way the Ethernet packet is not merely forwarded from one interface of the IP router to another interface of the IP router but has also undergone a transformation and translation into a new Ethernet packet.

It should be remarked that in an IP router each port needs its own Layer 2 address, whereas according to the present invention this is not a requirement. This means that in the event of e.g. forwarding an IP packet over Ethernet, in the above example of the IP router, the encapsulated IP packet, needs the MAC address of the forwarding port as source MAC address in the newly created MAC header. This is not a requirement in the present network unit of the invention.

Indeed, the network unit of the present invention receives a Layer 2 packet, forwards the Layer 2 packet and transmits a Layer 2 packet without changing the header of the Layer 2 packet. This means that the Layer 2 packet is received at an interface by the network unit and is forwarded towards another interface of the network unit without de-capsulation or encapsulation of the Layer 3 packet or without changing the Layer 2 header in the network unit.

Furthermore it has to be remarked that the network unit according to the present invention maintains a table keeping complete Layer 3 addresses such as complete IP addresses, whereas an IP router has a routing table keeping sub-nets of IP addresses, called masks, covering multiple IP Addresses. As such, an IP router performs a "longest prefix match" i.e. a matching as long as possible mask, whereas the network unit of the present invention performs always an exact match lookup.

Another remark is that the present network unit realizes its forwarding based upon only one forwarding database i.e. with relations between Layer 3 addresses and interfaces of the network unit. No other forwarding database is needed to realize the forwarding of the complete Layer 2 packet through the network unit.

Herein, the Layer 2 packet is an Ethernet packet and the Layer 3 packet is an Internet Protocol packet. In this way, the Network unit of the present invention forwards an Ethernet packet from its receiving interface towards an associated interface merely based upon the destination Internet Protocol address included in the Internet Protocol packet included in the payload of the Ethernet packet, based upon only one forwarding table that includes associations between interfaces of the network unit and IP addresses and without any transformation of the Ethernet header of the Ethernet packet. The present invention aims among other things the direct association between a Layer 3 destination address e.g. destination IP address and a physical of logical interface of the network unit and the fact that the forwarding of the Layer 2 packet e.g. an Ethernet packet is based on this direct association.

An outstanding problem is that "logical" grouping of devices into sub-nets of Layer 3 addresses, such as sub-nets of IP addresses which are belonging to different logical sub-nets, are not reachable through the same interface of an IP router or Ethernet Bridge. Indeed, it has to be explained that the interfaces of the association-entries in the forwarding database can be implemented by physical interfaces or by logical interfaces. An advantage of defining the interfaces of the association-entries in the forwarding database as logical interfaces is that a Virtual Local Area Network can be associated to a logical interface whereby different Virtual Local Area Networks can be coupled to one physical link of the network unit. In this way, a Layer 2 packet is firstly forwarded through the network unit of the present invention based upon the Layer 3-destination address in the payload of the Layer 2 packet, towards a logical interface of the network unit. Hereafter, according to the destined logical interface an associated Virtual Local Area Network—tag might be introduced e.g. after the Layer 2 header of the Layer 2 packet.

Furthermore, it has to be explained that the forwarding database can be populated either in a manual way e.g. via a management operation or automatically e.g. self-learning. Similar to the Self-learning Ethernet Bridge, the network unit according to the present invention can also learn the Addresses for the forwarding database by himself. In this mode, the network unit of the present invention verifies whether the source IP Address of every received packet is already known in the table. This means that similar to the detection and extraction of the Layer 3 destination address in the payload of the Layer 2 packet, the network unit is enabled to e.g. determine a predefined starting bit in the Layer 2 packet and to determine a predefined offset and to determine herewith this Layer 3 source address. Once the Layer 3 source address is found in the Layer 3 packet, the verification of the presence of this address in the forwarding database can be started. If the source address is not found, the network unit adds an entry association that links the source Layer 3 address e.g. IP address and the interface upon which the Layer 2 packet was received. If the source address is found, the entry's "last received" timer can be reset. This timer can optionally provide an implicit "aging" mechanism, as is applicable in Ethernet Bridges. The forwarding database is built up according to a self-learning principle based upon the entry of an association between a source Layer 3 address in the payload of the Layer 2 packet and the receiving interface upon which the Layer 2 packet was received.

Finally, it has to be explained that when the Layer 3 address is not found in the table, the Layer 2 packet might be distributed over all interfaces, except the incoming interface. Indeed, upon failing of a full match with one of the Layer 3 addresses of the forwarding database, the forwarding engine replicates and forwards the Layer 2 packet to a predetermined plurality of the plurality of interfaces of the network unit. The predetermined plurality can be defined with all interfaces of the network unit except the incoming interface or as a predefined subset of the interfaces.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BRIEF DESCRIPTION

Figure 1:
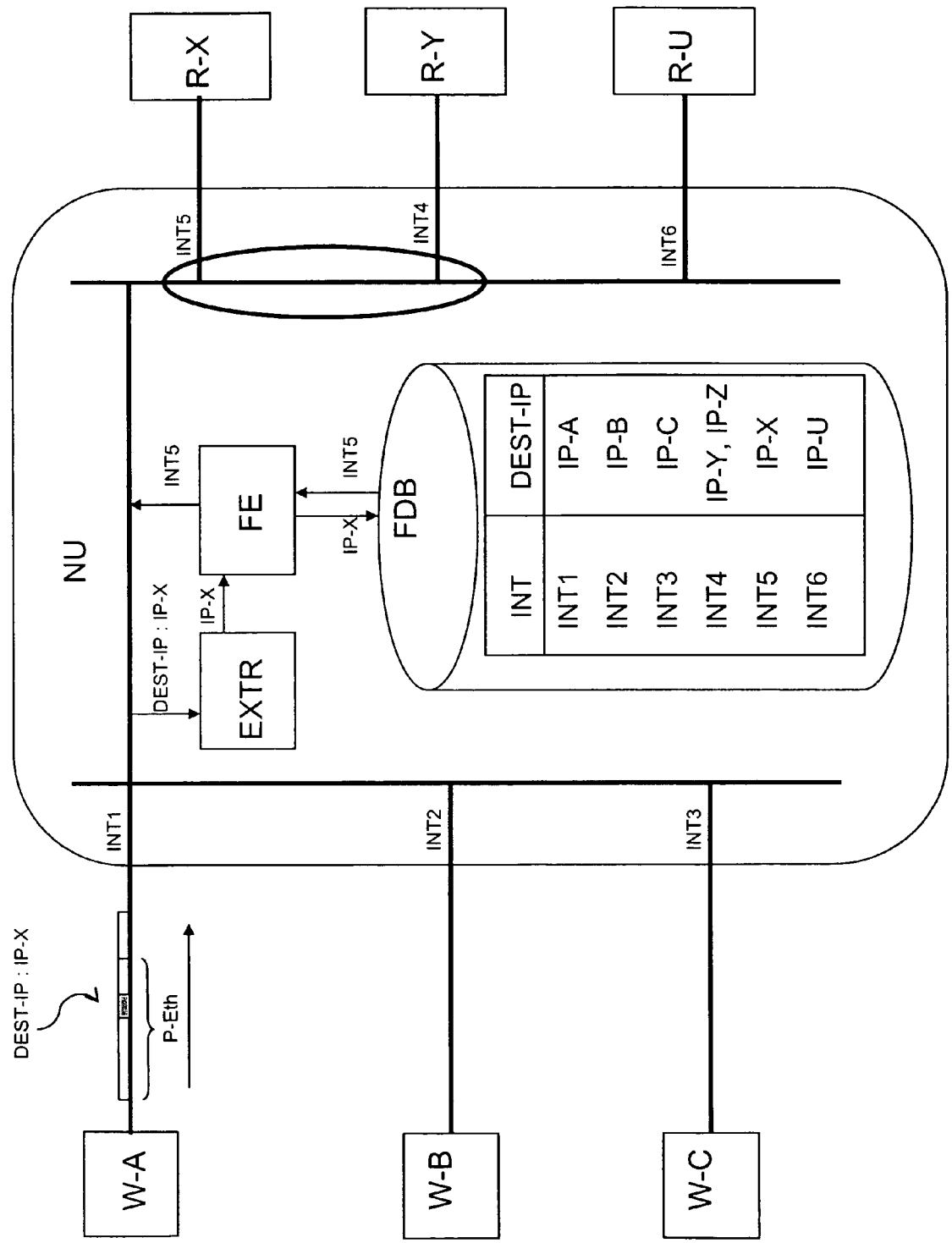
FIG. 1 shows a telecommunication network that includes a network unit NU for forwarding a Layer 2 packet.

Referring to the FIG. 1, the telecommunication network includes an access network that includes as a matter of an example:
three workstation i.e. W-A, W-B and W-C; and
the network unit of the invention NU; and
three access routers R-X, R-Y, R-U.

Each workstation W-A, W-B and W-C is coupled to an interface of the network unit NU, respectively, INT1, INT2 and INT3.

The network unit NU is included to forward Layer 2 packets from one incoming interface to another interface. Each Layer two packet includes in its payload a Layer 3 packet.

As example implementation, Ethernet packets are implementing the Layer 2 packets and Internet Protocol packets are implementing the Layer 3 packets. This means that the access network of the present embodiment is an Internet Protocol over Ethernet access network.

Each access router R-X, R-Y, R-U is coupled to an interface of the network unit NU, respectively, INT5, INT4 and IN6.

It has to be remarked that the interfaces INT1, INT2, INT3, INT4, INT5 and INT6 are logical interfaces. This means that different logical interfaces can be grouped into one physical interface. Such kind of grouping of two logical interfaces in one physical interface is shown for INT4 and INT5.

The network unit includes an extractor EXTR, a forwarding engine FE and a forwarding database FDB.

The extractor EXTR is coupled to each interface of the network unit NU that is enabled to receive incoming packets.

The forwarding engine is coupled between the extractor EXTR and the forwarding database FDB. Furthermore the forwarding engine FE is coupled to each interface of the network unit NU that is enabled to transmit packets.

As mentioned above, the extractor EXTR is coupled to one of the interfaces of the network unit e.g. INT1 to receive an Ethernet packet. Such an Ethernet packet is shown in FIG. 1 whereby the payload of the Ethernet packet is referred to as P-Eth. As a matter of example, this Ethernet packet has to be forwarded in the upstream direction i.e. from the workstation W-A towards the core of the network.

The extractor EXTR is enabled to extract from the payload of the received Layer 2 packet, according to this preferred embodiment: the payload of the Ethernet packet P-Eth, a destination Layer 3 address DEST-IP of a Layer 3 packet, according to this preferred embodiment: the destination IP address of the IP packet. The extractor EXTR is enabled to determine in the Ethernet payload P-Eth the destination IP address. How this can be realized is explained in a previous paragraph. However, other methods can be used in order to determine the destination IP address of the IP packet in the payload of the Ethernet packet. These different methods are going beyond the aim of the present invention. The aim of the present invention is that the extractor is enabled to extract from a Layer 3 packet that is encapsulated in the payload of a Layer 2 packet, the destination address of the Layer 3 packet. As an example, it is shown in FIG. 1 that an extracted destination IP address DEST-IP is IP-X. (shown with DEST-IP: IP-X)

This destination IP address is forwarded to the forwarding engine FE of the network unit NU.

The forwarding engine FE is enabled to receive the destination IP address from the extractor EXTR. Furthermore, the forwarding engine FE controls the retrieving of an associated interface from the forwarding database FDB based upon this destination IP address DEST-IP: IP-X. This means that the forwarding engine FE provides the destination IP address to the forwarding database and expects in return from the forwarding database FDB either an associated interface reference i.e. an interface of the network unit or a 'no full match found—message'.

In the event of reception of an associated interface e.g. INT5 from the forwarding database FDB the forwarding engine controls the forwarding of the received Ethernet packet towards this associated interface INT5.

In the event of reception of a 'no full match found—message' by the forwarding engine FE from the forwarding database FDB, the forwarding engine FE replicates the received Ethernet packet and controls the forwarding of the received Ethernet packet towards a predetermined plurality of interfaces e.g. INT2, INT3, INT4, INT5 and INT6. The predetermined plurality of interfaces INT2, INT3, INT4, INT5 and INT6 is mostly determined as all the other interfaces of the network unit NU except the interface upon which the packet was received. In this way the network unit realizes a flooding of the Ethernet packet.

The forwarding database FDB includes association entries between one of the interfaces INT1, INT2, INT3, INT4, INT5 and INT6 of the network unit NU and at least one Internet Protocol address. In this way the following association entries are shown in the forwarding database FDB:
INT1 with IP-A;
INT2 with IP-B;

INT3 with IP-C;
INT4 with IP-Y and IP-Z;
INT5 with IP-X;
INT6 with IP-U.

It has to be remarked that the Internet Protocol address IP-Z is a destination address of a network element that is not shown in FIG. 1. However, in this example, the associated interface INT4 has also an association with the IP address IP-Y, which means, for this example that the network element with the IP-Z address is reachable via, firstly, interface INT4 of the network unit and, secondly, via the network element i.e. router Y R-Y, with the IP address Ip-Y.

The forwarding database FDB is enabled
to receive at an input, a destination IP address i.e. an IP address;
to search and to look-up in the table a full match i.e. an exact match of the destination IP address with one of the IP addresses in its associated entries; and
upon finding of such a full match between the received destination IP address and one of the IP addresses in its table, to determine the associated interface which this one IP address; and
to provide this associated interface to an output of the forwarding database FDB i.e. to the forwarding engine FE; and
upon no finding of such a full match between the received destination IP address and one of the IP addresses in its table, to generate a 'no full match found—message' and to provide this message to the forwarding engine FE.

According to the example in FIG. 1, a full match is found between the extracted destination address DEST-IP: IP-X and the IP address in the table i.e. IP-X. The associated interface is determined i.e. INT5 and is provided to the forwarding engine FE.

It has to be explained that the forwarding database FDB is built up according to a self-learning principle. This means that the network unit uses the information of the received Ethernet packets in order to learn by itself the association entries for its forwarding database FDB. This information is based upon:
a source IP address of the IP packet that is encapsulated in the payload of the Ethernet packet; and
the receiving interface e.g. INT1 of the plurality of interfaces INT1, INT2, INT3, INT4, INT5 and INT6 at which the Ethernet packet is received.

This self-learning principle is explained more in detail in an above paragraph and will not be repeated here.

Hereafter, the principle working of the method to forward in a telecommunication network a Layer 2 packet e.g. an Ethernet packet, being received at an interface INT1 of a plurality of interfaces INT1, INT2, INT3, INT4, INT5 and INT6 of a network unit NU, and wherein the payload of the Layer 2 packet includes a Layer 3 packet e.g. IP packet will be described in further detail.

The forwarding method includes the following steps:
including in the forwarding database FDB at least one association between one of the plurality of interfaces INT1, INT2, INT3, INT4, INT5 and IP6 and at least one IP packet address. How the association entries are determined is described in an earlier paragraph.
extracting by the extractor EXTR from a payload of the Ethernet packet P-Eth a destination IP address e.g. DEST-IP:IP-X;
in response to the extraction, retrieving by the forwarding engine FE, with the determined destination IP address i.e. IP-X, and upon detection of a full match with one of the IP addresses in the association entries in the forwarding database FDB, from the forwarding database (FDB), the associated interface INT5 that is associated to the IP address having the full match; and
thereby enabling the forwarding engine FE of the network unit NU to forward the Ethernet packet to the associated interface INT5.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A network unit in a telecommunication network for forwarding a Layer 2 packet being received at a receiving interface of a plurality of interfaces of said network unit, a payload of said Layer 2 packet comprising a Layer 3 packet, wherein said network unit comprises:
an extractor which extracts from said payload of said Layer 2 packet a destination Layer 3 address of said Layer 3 packet; and
a forwarding engine, which, for in response to said extraction, with said destination Layer 3 address retrieves from a forwarding database an associated interface;
said forwarding database, comprising at least one association between one of said plurality of interfaces and at least one Layer 3 address, for upon reception of said destination Layer 3 address having a full match with one of said Layer 3 addresses, providing the associated interface of said plurality of interfaces being associated to said one Layer 3 address;
thereby enabling said network unit to forward said Layer 2 packet to said associated interface,
wherein the forwarding engine, upon failing of the full match with one of said Layer 3 addresses of the forwarding database, replicates and forwards the Layer 2 packet to a predetermined plurality of the plurality of interfaces.

2. The network unit according to claim 1, wherein said Layer 2 packet is an Ethernet packet and wherein said Layer 3 packet is an Internet Protocol packet.

3. The network unit according to claim 1, wherein said one of said plurality of interfaces of said association in said forwarding database is a logical interface.

4. The network unit according to claim 1, wherein said forwarding database is built up according to a self-learning principle based upon a source Layer 3 address in said payload of said Layer 2 packet, and said receiving interface of said plurality of interfaces at which said Layer 2 packet is received.

5. A telecommunication network that comprises a network unit to forward a Layer 2 packet according to claim 1.

6. The network unit according to claim 1, wherein the forwarding database provides to the forwarding engine the interface which is associated with the Layer 3 address in the forwarding database, which Layer 3 address returns the full match with the extracted destination Layer 3 address.

7. The network unit according to claim 6, wherein the forwarding database generates a "no full match found" message if the full match between the extracted destination Layer 3 address and one of the Layer 3 addresses is not found by the forwarding database and provides the generated message to the forwarding engine.

8. The network unit according to claim 7, wherein the forwarding engine receives the "no full match found" message and forwards the Layer 2 packet to all of the plurality of the interfaces except the receiving interface.

9. The network unit according to claim 7, wherein the forwarding engine forwards the Layer 2 packet to the interface provided by the forwarding database.

10. The network unit according to claim 1, wherein a position of the Layer 3 destination address in the payload of the Layer 2 packet is detected prior to extracting.

11. The network unit according to claim 1, wherein the forwarding engine forwards the layer 2 packet via the associated interface without any change to a header of the Layer 2 packet.

12. The network unit according to claim 1, wherein the layer 3 destination address includes a destination Internet Protocol (IP) address and wherein the forwarding database includes a direct association of the destination IP address and the interface so that the layer 2 packet is forwarded to the associated interface based on only one association in only one database.

13. A method to forward in a telecommunication network a Layer 2 packet being received at an interface of a plurality of interfaces of a network unit, a payload of said Layer 2 packet comprising a Layer 3 packet, the method comprising:
providing, in a forwarding database, at least one association between one of said plurality of interfaces and at least one Layer 3 address; and
extracting by an extractor from the payload of said Layer 2 packet a destination Layer 3 address of said Layer 3 packet;
in response to said extraction, retrieving by a forwarding engine, with said destination Layer 3 address having a full match with one of said Layer 3 addresses, from said forwarding database the associated interface of said plurality of interfaces being associated to said one Layer 3 address, thereby enabling said network unit to forward said Layer 2 packet to said associated interface; and
upon failing of the full match with one of the Layer 3 addresses of the forwarding database, replicating and forwarding the Layer 2 packet to a predetermined plurality of the plurality of interfaces.

14. A network unit of a telecommunication network for forwarding a Layer 2 packet being received at a receiving interface of a plurality of interfaces of the network unit, wherein a payload of the Layer 2 packet comprises a Layer 3 packet, the network unit comprising:
an extractor to extract from the payload of the Layer 2 packet a destination address of the Layer 3 packet;
a forwarding database comprising a look up table comprising at least one association between one of the plurality of interfaces and at least one Layer 3 address, which database receives the extracted destination Layer 3 packet address and performs a search to locate a full match between the extracted destination Layer 3 packet address and one of the Layer 3 addresses in the table; and
a forwarding engine, which retrieves an interface associated with the extracted destination Layer 3 packet address from the forwarding database based on the located full match Layer 3 address and forwards the Layer 2 packet to the retrieved interface,
wherein the forwarding database generates a "no full match found" message if the full match between the extracted destination Layer 3 packet address and one of the Layer 3 addresses in the table is not found and provides the generated message to the forwarding engine.

15. The network unit according to claim 14, wherein the forwarding engine receives the "no full match found" message and forwards the Layer 2 packet to all of the plurality of the interfaces except the receiving interface via which the Layer 2 packet is received at the network unit.

* * * * *

UNITED STATES PATENT AND TRADEMARK OFFICE
CERTIFICATE OF CORRECTION

PATENT NO. : 7,583,616 B2
APPLICATION NO. : 10/993121
DATED : September 1, 2009
INVENTOR(S) : Moreels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this

Fourteenth Day of September, 2010

David J. Kappos
*Director of the United States Patent and Trademark Office*